(12) United States Patent
Yu et al.

(10) Patent No.: US 7,326,396 B2
(45) Date of Patent: Feb. 5, 2008

(54) METHOD FOR PREPARING NANOPOROUS CARBONS WITH ENHANCED MECHANICAL STRENGTH AND THE NANOPOROUS CARBONS PREPARED BY THE METHOD

(75) Inventors: Jong Sung Yu, Daejun-Shi (KR); Jin Gyu Lee, Seoul (KR); Seok Chang, Daejun-Shi (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 565 days.

(21) Appl. No.: 10/325,884

(22) Filed: Dec. 23, 2002

(65) Prior Publication Data

US 2004/0091415 A1    May 13, 2004

(30) Foreign Application Priority Data

Nov. 13, 2002   (KR) .................... 10-2002-0070304

(51) Int. Cl.
*C01B 31/02* (2006.01)
(52) U.S. Cl. .................................. 423/445 R
(58) Field of Classification Search ............ 423/445 R; 502/426
See application file for complete search history.

(56) References Cited

U.S. PATENT DOCUMENTS 4,657,876 A * 4/1987 Hillig .......................... 501/87
6,585,948 B1 * 7/2003 Ryoo et al. .............. 423/445 R
6,812,187 B1 * 11/2004 Pak et al. ................... 502/180

OTHER PUBLICATIONS

Synthesis of New, Nanoporous Carbon with Hexagonally Ordered Mesostructure, by Shinae Jun et al, J. American Chemical Society, vol. 122, No. 43, Oct. 12, 2000, pp. 10712-10713.

Synthesis of highly ordered nanoporous cabon molecular sieves from silylated MCM-48 using divinylbenzene as precursor, by Suk Bon Yoon, Jeong Yeon Kim and Jong-Sung Yu, The Royal Society of Chemistry, Chem Commun., 2001, pp. 559-560.

Synthesis of Highly Ordered Carbon Molecular Sieves via Template-Mediated Structural Transformation, by Ryong Ryoo, Sang Hoon Joo and Shinae Jun, The Journal of Physical Chemistry B, vol. 103, No. 37, Sep. 16, 1999.

Synthesis of a new mesoporous carbon and its application to electrochemical double-laer capacitors, by Jinwoo Lee, Songhun Yoon, Taeghwan Hyeon, Seung M. Oh and Ki Bum Kim, The Royal Society of Chemistry, Chem Commun., 1999, pp. 2177-2178.

* cited by examiner

*Primary Examiner*—Stuart Hendrickson
(74) *Attorney, Agent, or Firm*—Harness, Dickey & Pierce, PLC

(57) ABSTRACT

The present invention relates to a method for preparing nanoporous carbons with enhanced mechanical strength and the nanoporous carbons prepared by the method, and more specifically, to a method for preparing a nanoporous carbon, comprising the steps of (i) synthesizing a mesoporous silica template not being subjected to any calcination process; (ii) incorporating a mixture of a monomer for addition polymerization and initiator, or a mixture of a monomer for condensation polymerization and acid catalyst into the as-synthesized mesoporous silica template, and reacting the mixture to obtain a polymer-silica composite; and (iii) carbonizing the polymer-silica composite at a high temperature to obtain a carbon-silica composite, from which the silica template is then removed using a solvent.

According to the preparation method of the present invention, the nanoporous carbons having uniform size of mesopores, high surface area and high mechanical stability can be prepared at low preparation cost through a simplified preparation process. Therefore, the nanoporous carbons of the present invention can be used as catalysts, catalyst supports, separating agents, hydrogen reserving materials, adsorbents, membranes and membrane fillers in various application fields.

5 Claims, 9 Drawing Sheets

METHOD FOR PREPARING NANOPOROUS CARBONS WITH ENHANCED MECHANICAL STRENGTH AND THE NANOPOROUS CARBONS PREPARED BY THE METHOD

BACKGROUND OF THE INVENTION

1. Field of the Invention

The present invention relates to a method for preparing nanoporous carbons with enhanced mechanical strength and the nanoporous carbons prepared by the method, and more specifically, to a method for preparing a nanoporous carbon, comprising the steps of (i) synthesizing a mesoporous silica template not being subjected to any calcination process; (ii) incorporating a mixture of a monomer for addition polymerization and an initiator, or a mixture of a monomer for condensation polymerization and an acid catalyst into the as-synthesized mesoporous silica template, and reacting the mixture to obtain a polymer-silica composite; and (iii) carbonizing the polymer-silica composite by heating it at a high temperature to obtain a carbon-silica composite, from which the silica template is then dissolved in a solvent.

2. Description of the Prior Art

Porous materials allowing fluids to flow therethrough can be classified by their pore sizes. Very small pores having diameters less than 2 nm called micropores, while very large pores (>50 nm) are called macropores. Pores of intermediate size between 2 and 50 nm are called mesopores. Among them, materials having mesopores have attracted considerable attention because they have pores that are large enough to readily allow liquids to enter the materials and provide liquid access to more surface area per unit volume of materials than either microporous or macroporous materials. In particular, nanoporous carbons, one type of the mesoporous materials, become the center of attention because they are synthesized from various precursors and have a variety of applications, such as catalysts, catalyst supports, separating agents, hydrogen reserving materials, adsorbents, membranes and membrane fillers.

In the conventional process, nanoporous carbon materials have been prepared from a mesoporous silica or alumina template obtained by using a surfactant, which is then removed through calcinations of the template. After calcinations, carbon precursors are introduced into the template and carbonized to produce a carbon-template composite, from which the template is dissolved with a certain solvent and removed [See: R. Ryoo, S. H. Joo and S. Jun, *J. Phys. Chem. B,* 1999, 103, 7743; S. H. Yoon, T. Hyeon, S. M. Oh and K. B. Kim, *Chem. Commun.,* 1999, 2177; S. B. Yoon, J. Y. Kim and J. S. Yu, *Chem. Commun.,* 2001, 559; S. Jun, S. H. Joo, R. Ryoo, M. Kruk and M. Jaroniec, *J. Am. Chem. Soc.,* 2000, 122, 10712]. The conventional method is desirable in terms of obtaining the carbon structure with various pore size, but, disadvantageously, its production cost is high due to the additional calcination. Besides, since the pore size in the template become considerably reduced and irregular in the calcinations, the resultant carbons have the thinner walls so their mechanical stability could be deteriorated and thus their lower strength may limit the use of the carbon.

Accordingly, in the field, there are strong reasons for exploring and developing an improved method of preparing nanoporous carbons having uniform-sized mesopore, high surface area and high mechanical stability through a simple process at low production cost.

SUMMARY OF THE INVENTION

The present inventors made an effort to solve the problems in the conventional method and, finally, found that when a mesoporous silica template which is not subjected to a calcination process is used, desired nanoporous carbons structure having uniform-sized mesopores, high surface area and high mechanical stability can be obtained.

The primary object of the present invention is, therefore, to provide a simple and efficient method of preparing nanoporous carbons with uniform-sized mesopore, high surface area and excellent mechanical stability at low production cost, which is advantageous in terms of simple and economical preparation process.

The other object of the present invention to provide a nanoporous carbon prepared by the method.

For these objects, One aspect of the present invention is a method for preparing nanoporous carbons, comprising the steps of: (i) synthesizing a mesoporous silica template not being subjected to any calcination process; (ii) incorporating a mixture of a monomer for addition polymerization and initiator, or a mixture of a monomer for condensation polymerization and acid catalyst into the as-synthesized mesoporous silica template, and reacting the mixture to obtain a polymer-silica composite; and (iii) carbonizing the polymer-silica composite by heating it at a high temperature to obtain a carbon-silica composite, from which the silica template is then removed using a solvent.

Another aspect of the present invention is nanoporous carbons prepared by the above method.

DETAILED DESCRIPTION OF THE INVENTION

The Process for preparing nanoporous carbons according to the present invention is more specifically explained with being divided into each step.

Step (i):

The mesoporous silica templates such as MCM-48 and SBA-154 are synthesized at first. In synthesizing the silica templates, pore structures, pore sizes and wall thickness between pores may be controlled with synthetic conditions such as temperatures, bulkiness of carbon chains in surfactants, or molar ratio of Si/surfactant. For a MCM-48silica template, it is synthesized by using hexadecyltrimethylammonium bromide ($C_{16}H_{33}N(CH_3)_3Br$; CTABr) and polyoxyethylene laurylether ($C_{12}H_{25}O(C_2H_4O)_4H$; Brij 30) as a surfactant, and colloidal silica Ludox HS40 or water glass as a source for silica. The molar ratio of a reaction mixture is 5.0 $SiO_2$:0.85 CTABr:0.15 $C_{12}H_{25}O(C_2H_4O)_4H$:1.25 $Na_2O$: 400 $H_2O$. After being stirred at room temperature, the mixture is reacted at 80-120° C. for 36-54 hours, cooled to room temperature, and the pH of the mixture is adjusted in the range of 9 to 11 with acetic acid. Again, it is heated to 80-120° C. and maintained at the same temperature for 36-48 hours. Precipitates, formed in the mixture, are filtered, washed with excess water, and dried at room temperature to yield a MCM-48 Silica template.

Alternatively, for SBA-15, it is synthesized by using tetraethyl orthosilicate (TEOS) or water glass, and a three-member copolymer (general formula=$EO_{20}PO_{70}EO_{20}$; P123) of poly(ethyleneoxide)-poly(propyleneoxide)-poly(ethyleneoxide) as a supply source of silica and a structure-directing agent, respectively. A reaction mixture consisting of 4.0 g P123, 30 g $H_2O$, 120 g 2M HCl and 8.50 g TEOS is stirred at the temperature of 35-100° C. for 15-25 hours to transform the mixture into its gel state, and then aged at the same temperature for 24 hours without stirring. A mesoporous solid silica formed in the reaction mixture is obtained by filtering and drying processes at room temperature.

If necessary, it is possible to wash the as-synthesized mesoporous silica template with a mixture of inorganic acid and organic solvent for removing the surfactants used in synthesis of the silica template. Examples of the inorganic acids include hydrochloric acid and nitric acid. Examples of the organic solvents include ethanol and methanol. Preferably, a mixture of hydrochloric acid/ethanol can be used. The concentration of the inorganic acid ranges from 0.05M to 0.2M, and preferably is 0.1M. By washing the template, 70-90% of the surfactant in the template can be removed.

Figure 1:
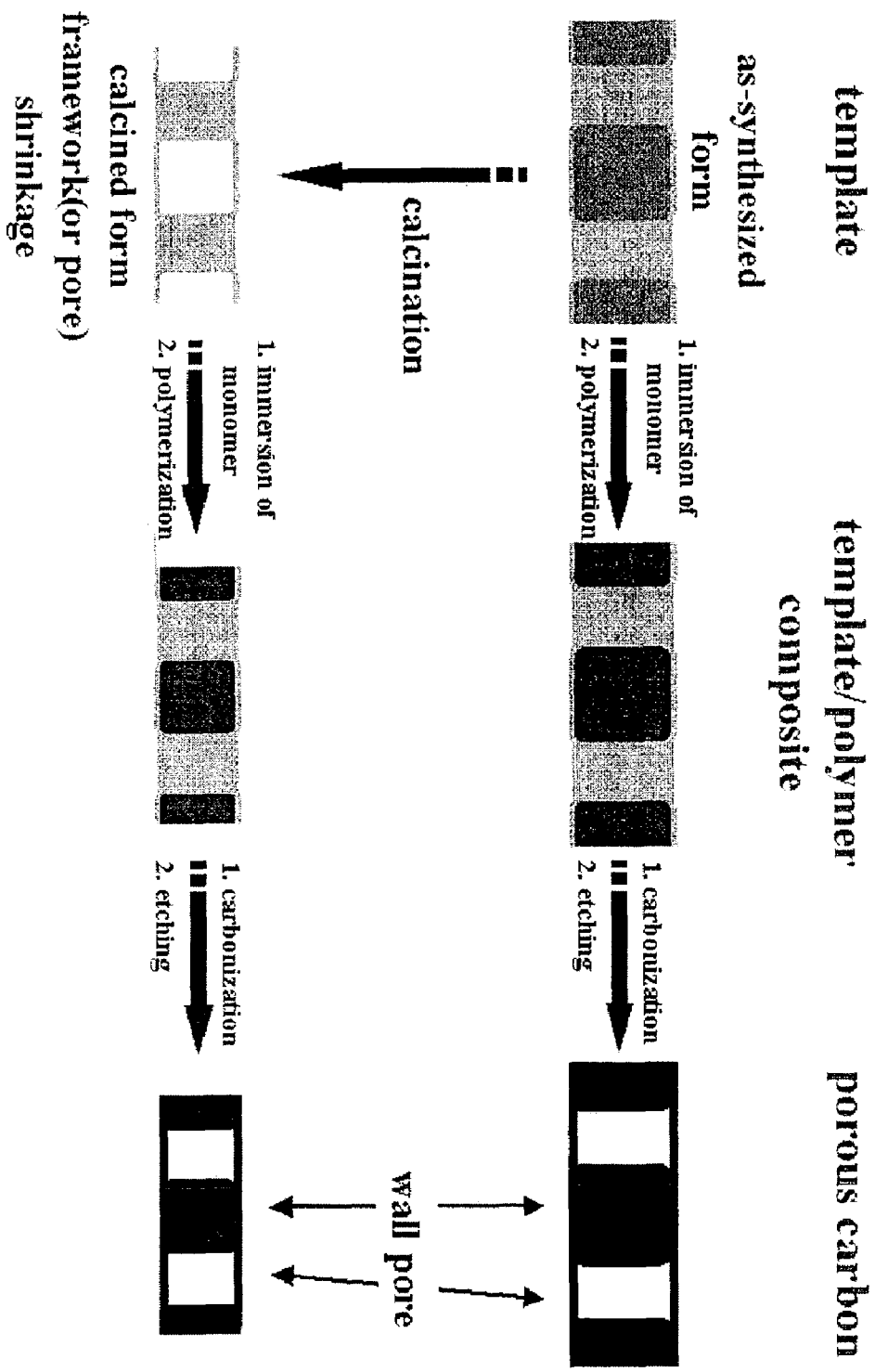
FIG. 1 is a schematic view showing the process of preparing nanoporous carbons according to the present invention, and the process of preparing them according to conventional techniques.

In the conventional process involving the some inorganic templates, calcinations at 500° C. or higher were performed essentially to remove the surfactant for the purpose of filling a carbon precursor into the synthesized mesoporous silica. However, according to research conducted by the present inventors, such calcinations cause not only to complicate the process, but also to increase production costs. Also, the lattice collapse or pore shrinkage in the template due to the calcinations results in thinner and irregular wall and lowers strength of the resulting carbons (See: FIG. 1). Meanwhile, given the fact that the surfactant itself can be considered as a good candidate for carbon precursor, its removal by calcination is thought to be undesirable wastes of raw materials. In case of the nanoporous carbon structure according to the present invention, therefore, the as-synthesized template is used directly without any calcination process so the surfactant can be used as a source of carbon precursor and, thereby, nanoporous carbons with excellent mechanical strength can be prepared at low preparation cost (see FIG. 1).

Step (ii)

In this step, a mixture of a monomer for addition polymerization and an initiator, or a mixture of a monomer for condensation polymerization and an acid catalyst is incorporated into the as-synthesized mesoporous silica template, and then go through polymerization to obtain a polymer-silica composite;

Examples for the monomer for the addition polymerization include divinylbenzene, acrylonitrile, vinyl chloride, vinyl acetate, styrene, methacrylate, methyl methacrylate, ethyleneglycol dimethacrylate and $CH_2$=CRR' (where, R and R' represent alkyl groups or aryl groups). The monomer may be used alone or in combinations thereof.

And azobisisobutyronitrile (AIBN), t-butyl peracetate, benzoyl peroxide (BPO), acetyl peroxide, or lauryl peroxide can be used as the initiator. The molar ratio of the monomer to initiator ranges from 15 to 35 preferably.

Examples of the monomer for condensation polymerization include phenol-formaldehyde, phenol, furfuryl alcohol, resorcinol, aldehyde, sucrose, glucose and xylose. The monomer can be used alone or in combinations thereof. Examples of acid catalyst include Sulfuric acid and hydrochloric acid. The molar ratio of the monomer to the acid catalyst ranges from 5 to 15.

The mixture is incorporated in the amount of 20-30 vol % based on the mesoporous silica template. The introduction of mixture can be carried out in a liquid or gas phase. More specifically, the liquid mixture can be incorporated into the silica template or, the gas mixture prepared by heating a suitable compound under the vacuum is incorporated into the mesopores of the template.

To produce a polymer-silica composite, the monomers for additional polymerization in the silica template are polymerized under the known optimal conditions varying with the types of monomer and the initiator used, but, preferably, at 60° C. to 90° C. for 3 to 30 hours.

In case of using the mixture of monomer for condensation polymerization and acid catalyst, polymerization is performed under the known conditions varying with the monomer and initiator, but, preferably, at 80° C. to 140° C. for 3 to 30 hours to obtain a polymer-silica composite.

Step (iii)

The polymer/silica composite is carbonized by thermally treating it at high temperature to yield a carbon-silica composite. The nanoporous carbons of the present invention can be produced by dissolving the silica template in a solvent.

The thermal treatment is carried out at 800° C. to 1500° C. for 5 to 15 hours under inert gas atmosphere, wherein the rate of temperature rise ranges from 1 to 100° C./min.

The inert gas is nitrogen, argon or helium.

During thermal treatment, the polymer and the surfactant are carbonized, thereby yielding the carbon-silica template composite.

The resulting carbon-silica composite is treated with a solvent. In this treatment, the silica template is removed and the nanoporous carbon is obtained. Specifically, by dipping and shaking the resulting carbon-silica template in a solvent at room temperature for 12 hours, only the silica template is removed, and, the nanoporous carbon material is filtered and washed with excess water and dried in an oven to afford a final nanoporous carbon structure.

The solvent is 40 wt % aqueous HF solution or an aqueous solution of about 2.0M NaOH or KOH.

The present invention is further illustrated in the following examples, which should not be taken to limit the scope of the invention.

EXAMPLE 1

Synthesis of Mesoporous Silica Template (1) Synthesis of Mesoporous Silica Template MCM-48:

To obtain a mesoporous silica template MCM-4, hexadecyltrimethylammonium bromide ($C_{16}H_{33}N(CH_3)_3Br$; CTABr) and polyoxyethylene laurylether ($Cl_2H_{25}O(C_2H_4O)_4$ H; Brij 30) were used as a surfactant, and colloidal silica Ludox HS40 or water glass was used as a supply source of silica. A reaction mixture comprising a silica, a surfactant, $Na_2O$ and water (5.0 $SiO_2$:0.85 CTABr:0.15 $C_{12}H_{25}O(C_2H_4O)_4H$:1.25 $Na_2O$:400 $H_2O$) was stirred at room temperature for 30 minutes, reacted at 100° C. for 48 hours and cooled to room temperature. After adjusting the pH of the reaction mixture to 10 with 30 wt % acetic acid, the mixture was heated to 100° C. and maintained at the same temperature for 48 hours and then cooled down the room temperature. The precipitates, formed in the mixture, were filtered, washed with excess water and dried at room temperature to obtain the mesoporous silica template MCM-48, which is denoted as AM48T.

(2) Synthesis of Mesoporous Silica Template SBA-15:

To obtain a mesoporous silica template SBA-15, tetraethyl orthosilicate (TEOS) or water glass, and a three-member copolymer (average MW=5,800, formula=$EO_{20}PO_{70}EO_{20}$; P123, purchased from Aldrich Co.) of poly(ethyleneoxide)poly(propyleneoxide)-poly(ethyleneoxide) were used as a supply source of silica and a structure-directing agent, respectively. Specifically, a reaction mixture comprising the three-member copolymer, water, aqueous solution of 2M hydrochloric acid and TEOS (composition=4.0 g P123:30 g $H_2O$:120 g 2M HCl:8.50 g TEOS) was stirred at 35° C. for 20 hours, to obtain the reaction mixture of gel state, which was then aged for 24 hours without stirring. The mesoporous solid silica SBA-15 formed in the reaction mixture was filtered and dried at room temperature. The as-synthesized SBA-15 is denoted as AS15T.

EXAMPLE 2

Preparation of Washed Mosoporous Silica Template

The mesoporous silica templates AM48T and AS15T obtained in the Example 1 were further washed with 0.1M HCl/EtOH and, thereby, Some of the surfactants (i.e. about 70-90%) in AM48T and AS15T were removed to yield washed mesoporous silica templates AWM48T and AWS15T.

COMPARATIVE EXAMPLE 1

Preparation of Calcined Mesoporous Silica Template

AM48T and AS15T prepared in the Example 1 were calcined at 550° C. for 5 to 10 hours to produce calcined templates, which are denoted as CM48T and CS15T hereinafter.

Figure 2A:
FIGS. 2a and 2b are transmission electron micrographs of calcined mesoporous silica template, i.e. CM48T and CS15T, respectively.
Figure 2B:
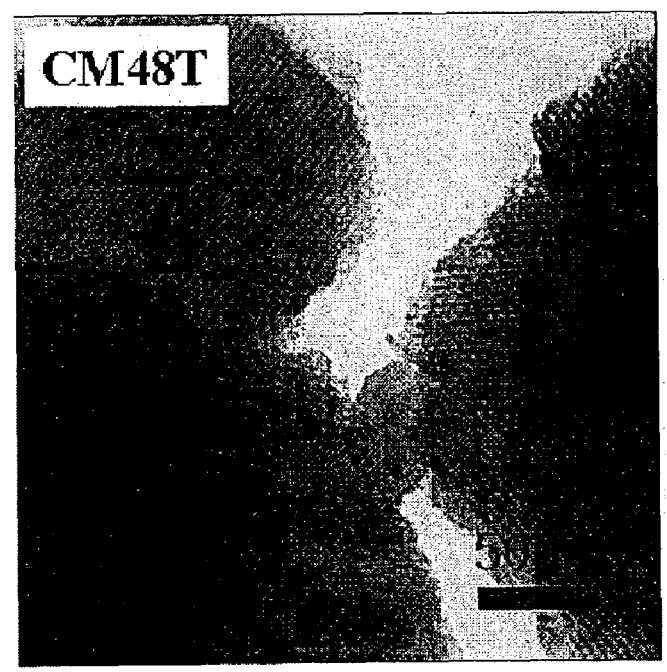

FIGS. 2a and 2b are transmission electron micrographs (TEM) of CM48T and CS15T, respectively.

Figure 3A:
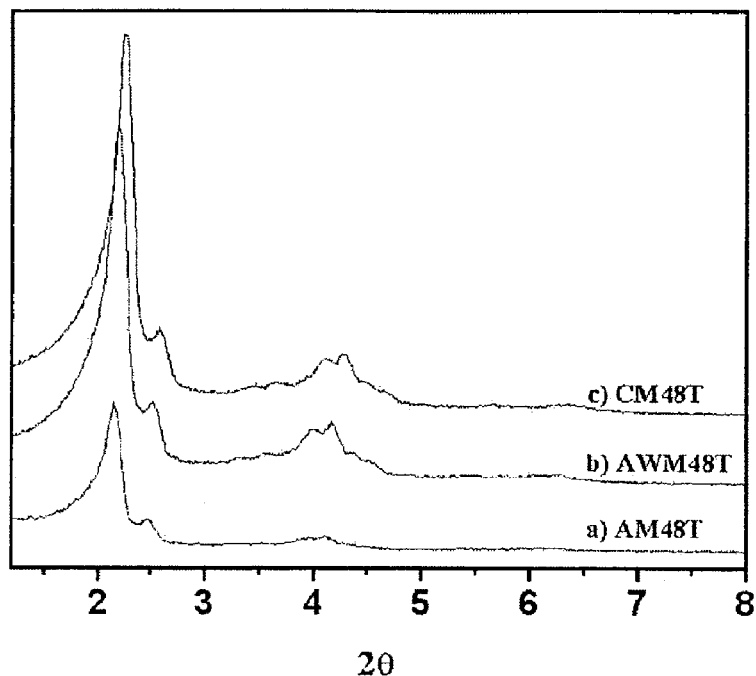
FIGS. 3a and 3b show powder X-ray diffraction (PXRD) patterns for (a) the as-synthesized mesoporous silica template and (b) the washed mesoporous silica template according to the present invention, and (c) a calcined mesoporous silica template according to the conventional techniques.
Figure 3B:
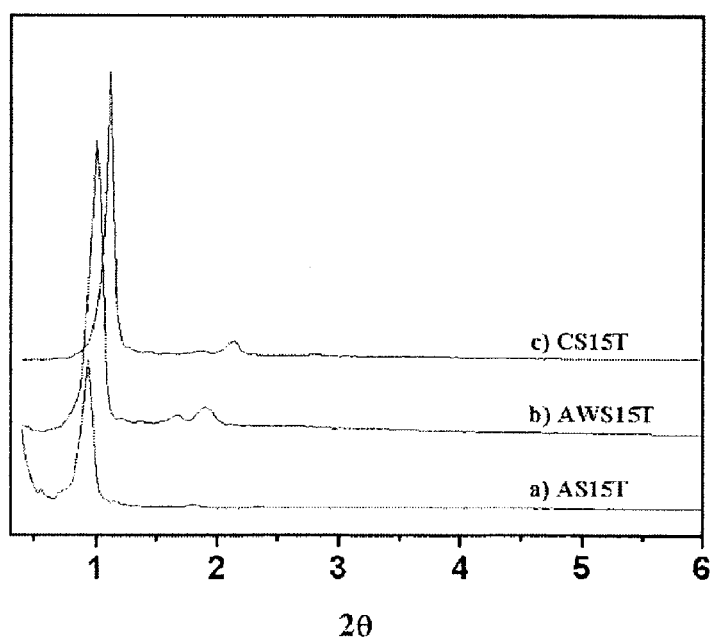

FIGS. 3a and 3b are views showing powder X-ray diffractions of AM48T, AS15T, AWM48T, AWS15T, CM48T and CS15T. As shown in the drawings, for calcined CM48T and CS15T, there are some significant signal shifts, which are assumed to be due to lattice collapse or structural shrinkage of pores.

EXAMPLE 3

Preparation of Nanoporous Carbons Using Silica Templates of Examples 1 and 2

(1) Preparation of Polymer-silica Template Composite

Preparation of Polymer-silica Template Composite Using Divinylbenzene:

Polymer-silica templates composite from the as-synthesized AM48T and AS15T, and the washed AWM48T and AWS15T were prepared using divinylbenzene (DVB) as a monomer and AIBN as an initiator.

Specifically, a mixture containing divinylbenzene and AIBN at the molar ratio of 1:25 was incorporated into mesopores of the templates in its liquid state, and, then, polymerized at 70° C. for 24 hours to form divinylbenzene polymer/silica template composites for each silica template.

(2) Preparation of Carbon-silica Template Composite and Nanoporous Carbons

Divinylbenzene polymer-silica composites obtained from (1) were carbonized at 1000° C. for 7 hours under nitrogen atmosphere to prepare corresponding carbon-silica composites. For removing the silica templates, the resulting composites were then dipped into an aqueous solution of 40 wt % HF (or aqueous solution of 2.0M NaOH or KOH) for 12 hours to produce nanoporous carbons AM48T-C, AS15T-C, AWM48T-C, and AWS15T-C which were then filtered and dried.

COMPARATIVE EXAMPLE 2

Preparation of Nanoporous Carbons Using Silica Templates Of Comparative Example 1

Nanoporous carbons were prepared in the same manner as the Example 3, except for using the calcined silica templates of the Comparative Example 1.

FIGS. 4a, 4b, 4c and 4d are transmission electron micrographs of the nanoporous carbons AM48T-C, AS15T-C, CM48T-C and CS15T-C, respectively.

Figure 4A:
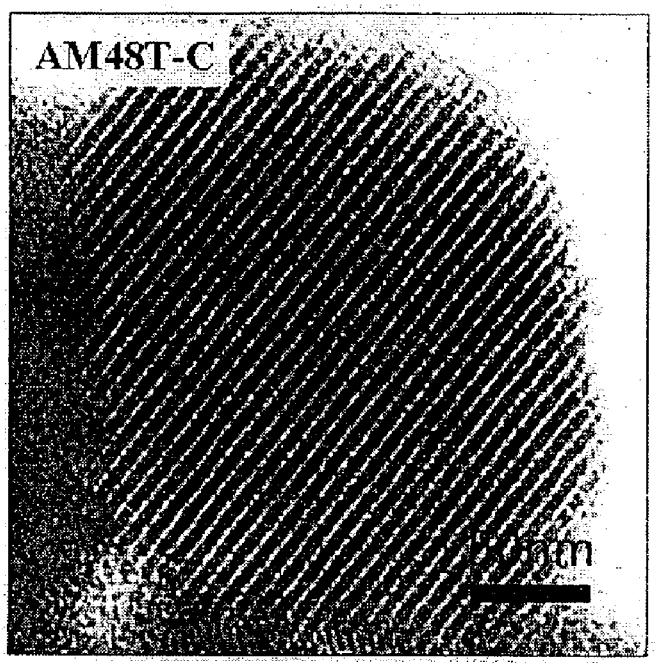
FIGS. 4a and 4b are transmission electron micrographs (TEM) of nanoporous carbons (AM48T-C, AS15T-C) prepared by the present invention, respectively.
Figure 4B:
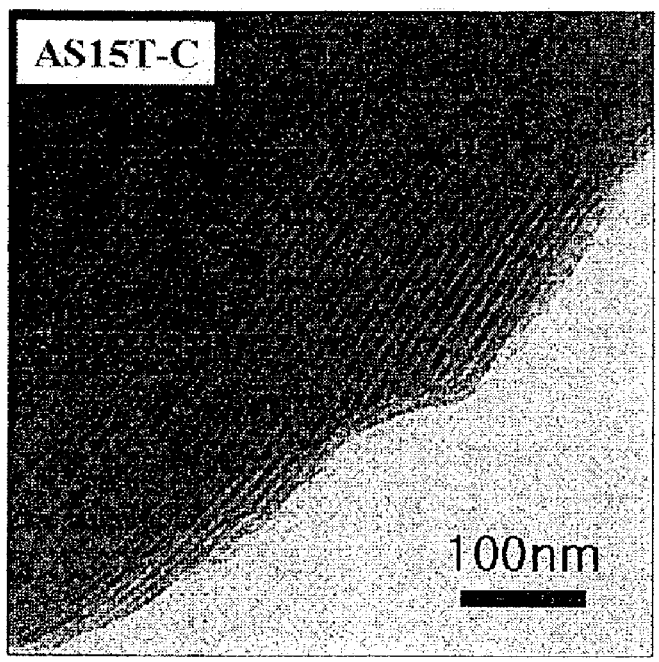
Figure 4C:
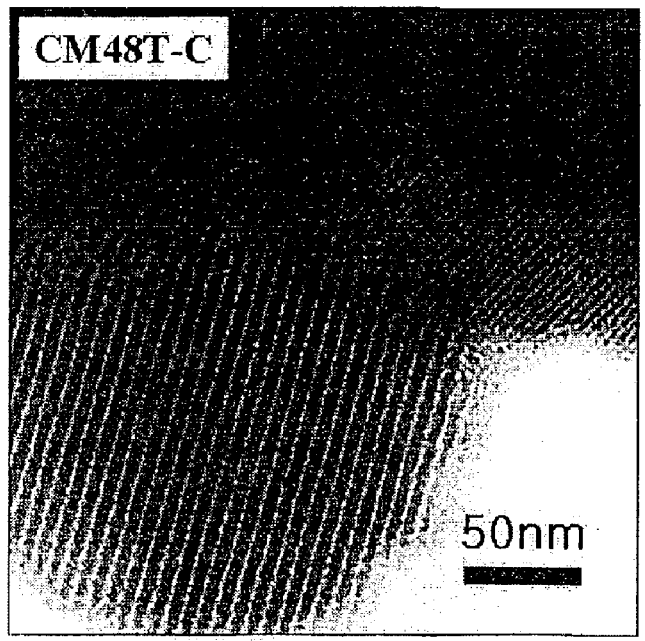
FIGS. 4c and 4d are transmission electron micrographs of nanoporous carbons (CM48T-C, CS15T-C) prepared by the conventional techniques, respectively.
Figure 4D:
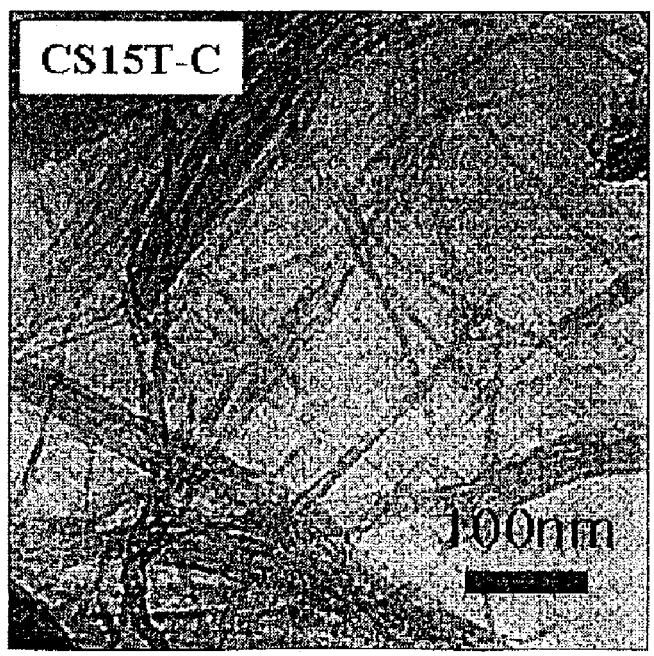

As observed in FIGS. 4a and 4b, not only have the nanoporous carbons according to the present invention well-prepared mesoframeworks and pores having uniform size, but the walls in the carbons are relatively thick and uniform. In contrast, as shown in FIG. 4c and, particularly, in FIG. 4d, carbon lines in the nanoporous carbons prepared from calcined templates are randomly disentangled like yarn. The reason of this can be assumed that the pore-shrinkage arisen in calcinations leads to another shrinkage of intermicropores connecting pores, so micro-branches in porous carbons are not strong enough. As a result, carbon composites according to conventional techniques show significantly low mechanical strength.

Figure 5A:
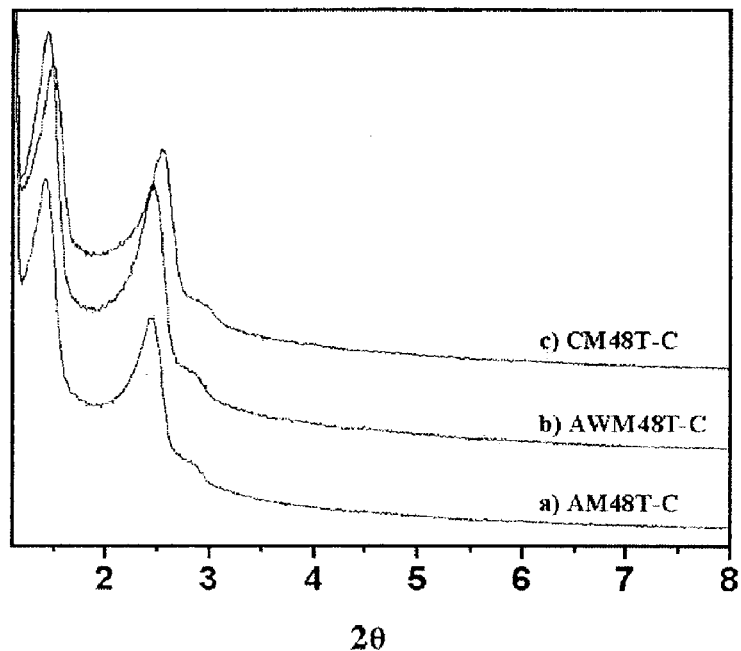
FIGS. 5a and 5b are powder X-ray diffraction (PXRD) patterns of nanoporous carbons synthesized by using (a) as-synthesized mesoporous silica template and (b) washed mesoporous silica template of the present invention, and (c) calcined mesoporous silica template according to the conventional techniques.
Figure 5B:
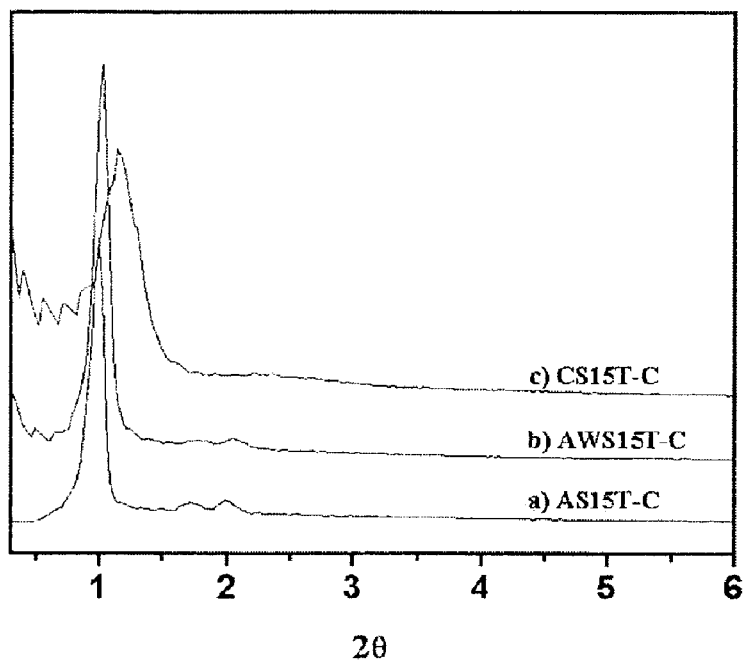

FIGS. 5a and 5b are views showing the powder X-ray diffraction (PXRD) patterns of the nanoporous carbons, i.e. AM48T-C, AS15T-C, AWM48T-C, AWS15T-C, CM48T-C and CS15T-C. As shown in the drawings, there are some signal shifts caused by shrinkage of the structure of carbons in CM48T-C and CS15T-C, and, especially, CS15T-C shows line broadening and decrease of signal intensity due to the structural collapse, which is correspondent with the result of FIG. 4d. While in AM48T and AS15T, AWM48T and AWS15T, there was no signal shift or line-broadening. From that, the nanoporous carbons of the present invention are believed to have larger unit lattices and thicker walls of carbons, and, thus, to exhibit higher mechanical stability.

Figure 6A:
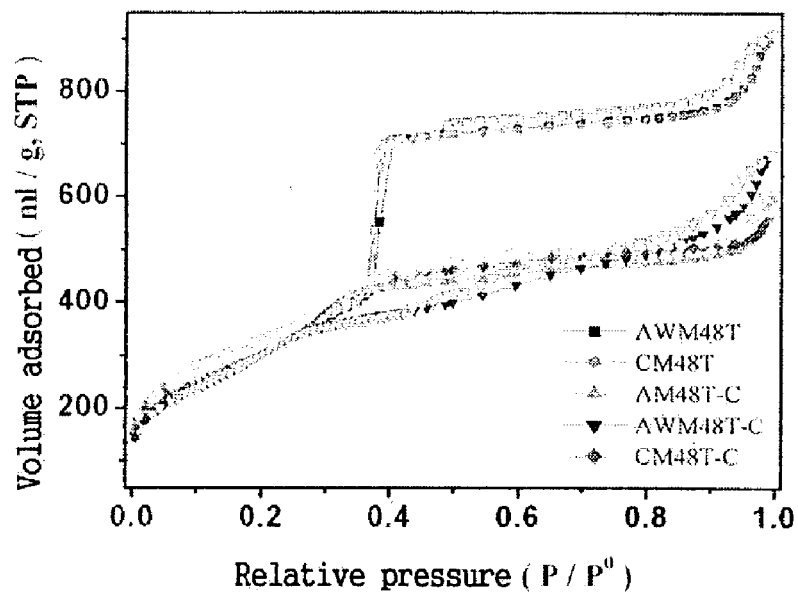
FIGS. 6a and 6c are BET adsorption isotherms of silica template of Examples 1, Example 2 and Comparative Example 1, and nanoporous carbons of Examples 3 and Comparative Example 2.
Figure 6B:
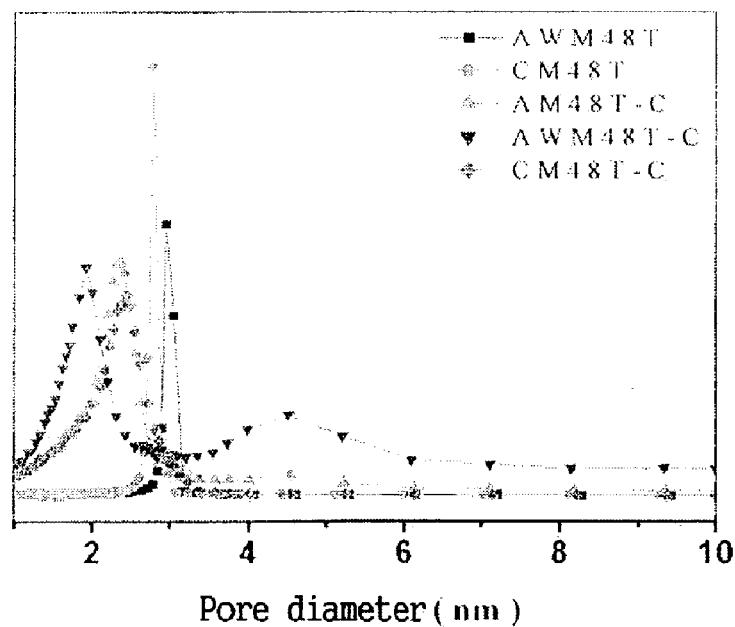
FIGS. 6b and 6d show pore size distributions thereof.
Figure 6C:
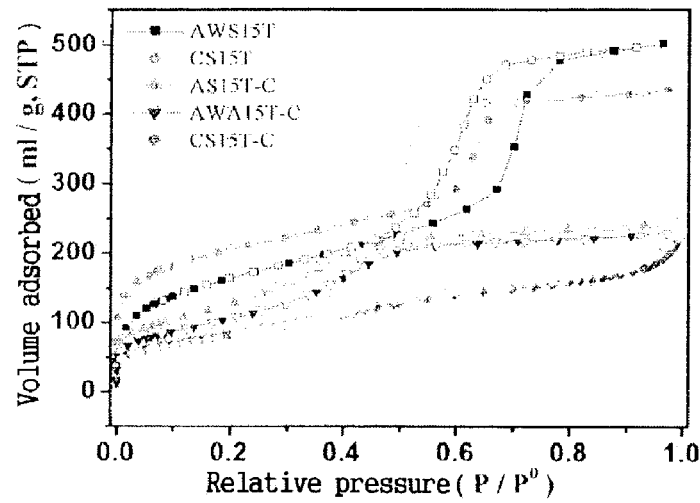
Figure 6D:
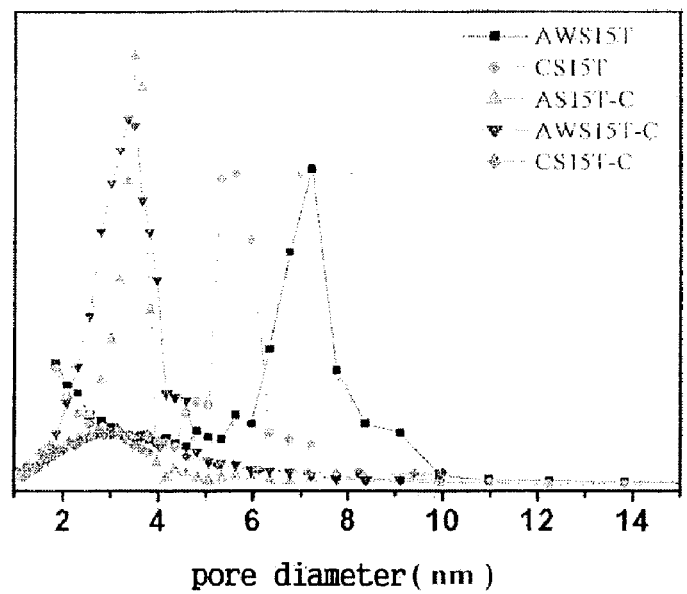

FIGS. 6a and 6c show BET adsorption isotherms of the mesoporous silica templates and nanoporous carbon structures made therefrom, and, FIGS. 6b and 6d show pore size distribution curves of the above templates and structures. As shown in these drawings, except for CS15T-C made from the CS15T template, all the silica templates and the nanoporous carbons have specific adsorption-desorption curves which are typical of mesopores having uniform pore sizes. In the case of CS15T-C, the result of the transmission electron microscope image of FIG. 4 accords to PXRD signals of FIG. 5. This indicates that the structure of the mesoporous carbon has been broken by conventional process. Its pores do not have uniform size.

Figure 7A:
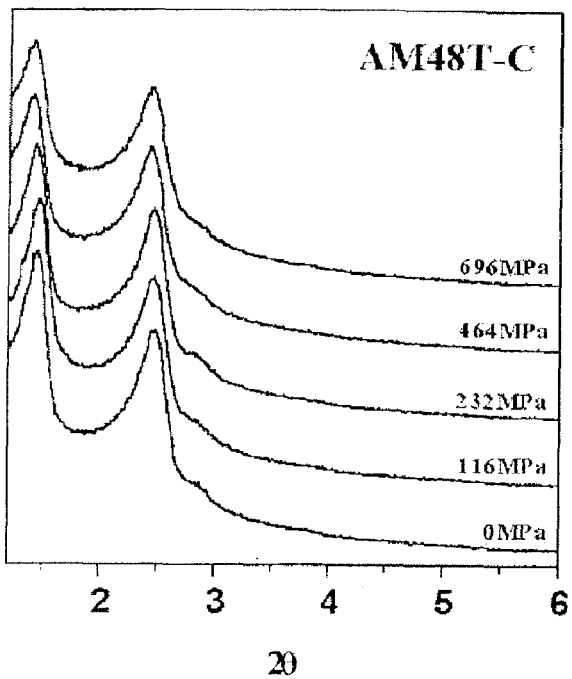
FIG. 7a is a powder X-ray diffraction pattern of nanoporous carbons of the present invention when pressing the carbons at each of different pressures.
Figure 7B:
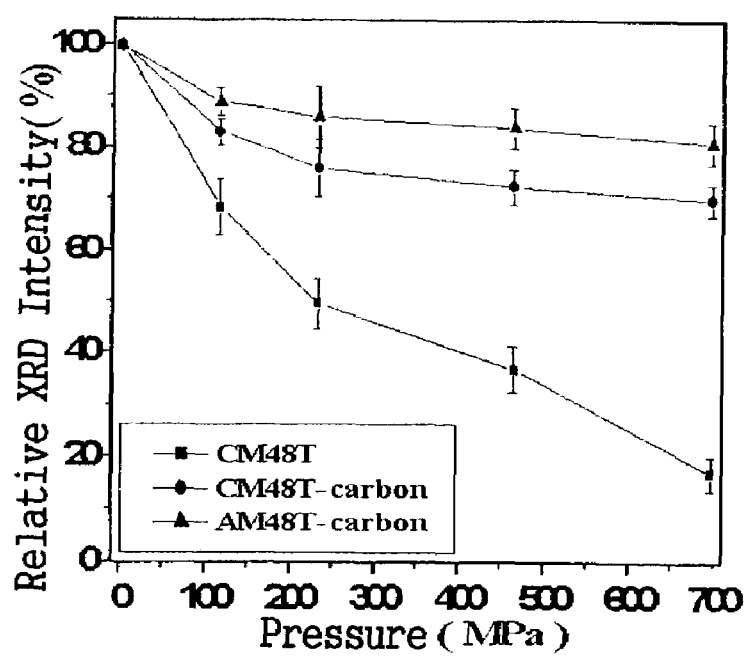
FIG. 7b is a graph plotting the relative powder X-ray diffraction intensity of AM48T-C, CM48T-C and CM48T versus pressures.

In FIGS. 7a and 7b, XRD intensity changes are monitored with pressuring AM48T-C, CM48T and CM48T-C at different pressures, which may serve as a criterion for mechanical stability. The relative intensity decreases mainly at low pressures less <120 Mpa and slowly decreases at higher pressures. The intensity for CM48T-C decreased more rapidly than that for AM48T-C with ca. 70% and ca. 80% of their corresponding initial intensity at 700 MPa, respectively. This fact indicates that the nanoporous carbons according to the present invention show better mechanical stability As described above, according to the preparation method of the present invention, the nanoporous carbons having uniform size of mesopores, high surface area and high mechanical stability can be prepared at low preparation cost through a simplified preparation process. Therefore, the nanoporous carbons of the present invention can be used as catalysts, catalyst supports, separating agents, hydrogen reserving materials, adsorbents, membranes and membrane fillers in various application fields.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A method for preparing nanoporous carbons, comprising:
    synthesizing a mesoporous silica template not being subjected to any calcination process and washing the as-synthesized mesoporous silica template with a solution consisting of an inorganic acid selected from hydrochloric acid, nitric acid and combinations thereof, and an organic solvent selected from methanol, ethanol and combinations thereof, and the concentration of the inorganic acid is from 0.05M to 0.2M;
    incorporating a mixture of a monomer for addition polymerization and initiator, or a mixture of a monomer for condensation polymerization and acid catalyst into the as-synthesized mesoporous silica template, and reacting the mixture to obtain a polymer-silica composite; and
    carbonizing the polymer-silica composite by heating to obtain a carbon-silica composite, from which the silica template is then dissolved using a solvent.

2. The method of claim 1, wherein the monomer for addition polymerization is selected from divinylbenzene, acrylonitrile, vinyl chloride, vinyl acetate, styrene, methacrylate, methylmethacrylate, ethylene glycol dimethacrylate, $CH_2=CRR'$ (where. R and R' represent alkyl groups or aryl groups) and combinations thereof, and the initiator is selected from azobisisobutyronitrile, t-butyl peracetate, benzoyl peroxide, acetyl peroxide and lauryl peroxide.

3. The method of claim 1, wherein the monomer for condensation polymerization is selected from phenol-formaldehyde, phenol, furfuryl alcohol, resorcinol, aldehyde, sucrose, glucose, xylose and combinations thereof, and the acid catalyst is sulfuric acid or hydrochloric acid.

4. The method of claim 1, wherein the carbonization of the polymer-silica composite is carried out at the temperature of 900 to 1000° C.

5. The method of claim 4, wherein the increase rate of temperature is from 1° C./min to 100° C/min.

* * * * *